W. & I. COGSWELL.

Harvester.

No. 2,007. Reissued June 20, 1865.

Inventors:
Wm Cogswell
Isa Cogswell Jr.

THE NORRIS PETERS CO., WASHINGTON, D. C.

UNITED STATES PATENT OFFICE.

WM. COGSWELL AND WM. H. W. CUSHMAN, OF OTTAWA, ILLINOIS, ASSIGNEES, BY MESNE ASSIGNMENTS, OF WM. COGSWELL AND IRA COGSWELL, JR.

IMPROVEMENT IN HARVESTERS.

Specification forming part of Letters Patent No. 26,338, dated December 6, 1859; Reissue No. 2,007, dated June 20, 1865.

*To all whom it may concern:*

Be it known that WILLIAM COGSWELL and IRA COGSWELL, Jr., both of Ottawa, in the county of La Salle and State of Illinois, did invent a new and Improved Harvesting-Machine; and we do hereby declare that the following is a full, clear, and exact description of the same, reference being had to the accompanying drawings, making part of this specification, in which—

Figure 1:
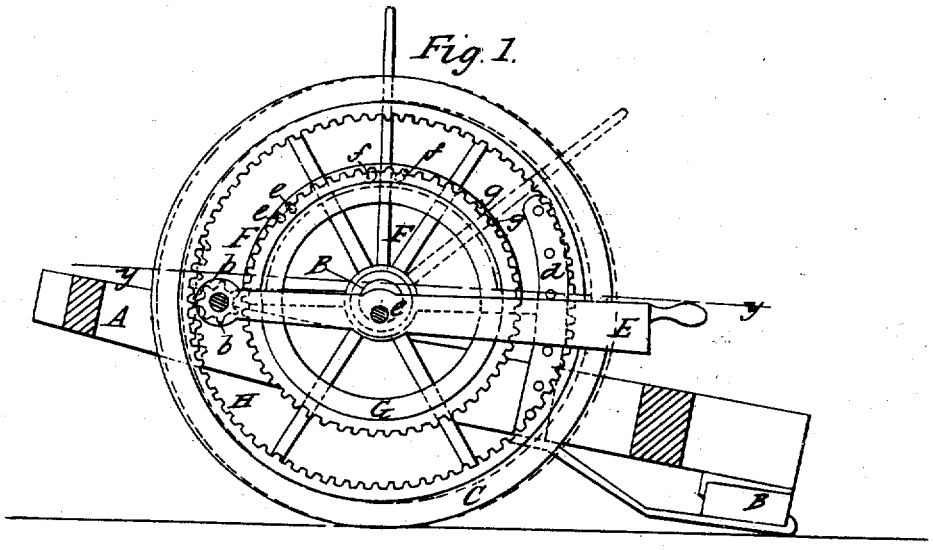
Figure 2:
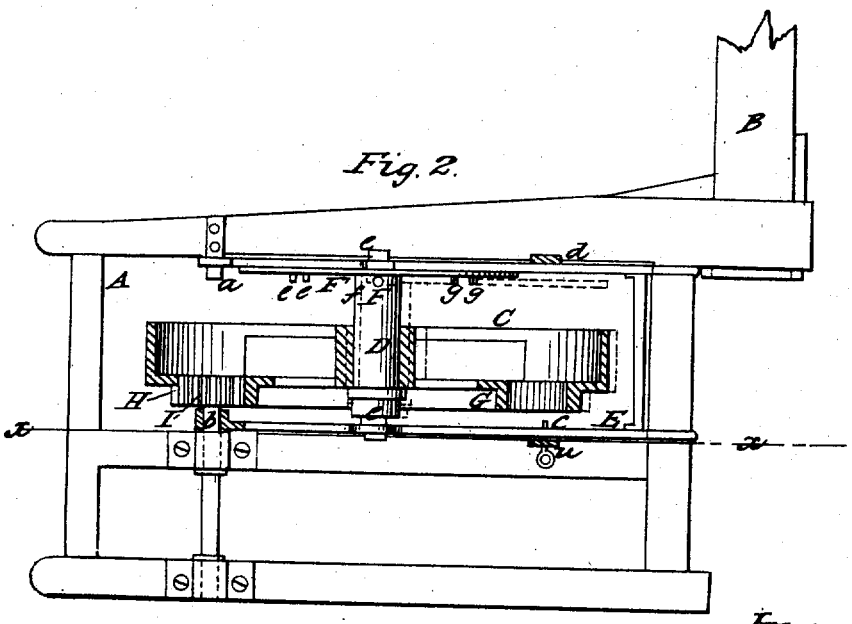

Figure 1 is a side sectional view of the invention. Fig. 2 is a horizontal section of the same.

Similar letters of reference indicate corresponding parts in the two figures.

The object of this improvement is to enable the pinion, which rotates in a permanent bearing in the frame, and is connected with the pitman, to run at different speeds and in different directions, by each of which results special beneficial results are attained, as will hereinafter appear. The object is attained by providing the driving-wheel with two distinct gear-wheels and making its axis movable forward and backward, so as to bring either one of the gears into engagement with the pinion, or the latter equidistant between the two cog-wheels and out of gear.

To enable those skilled in the art to fully understand and construct the invention, we will proceed to describe it.

A represents the main frame of a harvester, and B the finger-bar attached thereto. The main frame may be of the ordinary rectangular form, as shown in Fig. 2.

C is the driving-wheel, fitted loosely on its axle D, the latter being placed in a frame, E, the forward part of which is fitted loosely on a journal, *a*, and a shaft, *b*, the journal and shaft being in line with each other, as shown plainly in Fig. 2. The frame E is allowed to rise and fall freely in consequence of being fitted loosely on its journal and shaft, and it may be secured at any desired height within the scope of its movement by pins *c*, which pass through segment-bars *d d*, attached to the main frame. The journaling of the axle D in the rising and falling pivoted frame is merely a method of providing for the rising and falling of the main frame, as the machine is regulated for cutting at a greater or less height from the ground. Other means for permitting the rising and falling of the frame may be provided and the pivoted frame E dispensed with. The axle D of the driving-wheel C has eccentric journals formed at its ends, and is journaled in the frame E, so as to turn therein.

To the axle D a lever, F, is attached, said lever being fitted between pins *f f*, *g g*, or *h h* in a semicircular plate, F′, attached to the main frame, said pins and lever securing the axle D in three different positions. The driving-wheel is so journaled on the axle as to be moved forward or backward by the partial rotation of the axle, on which it runs freely.

To the outer side of the driving-wheel C a toothed wheel, G, is attached concentrically, and a geared flange, H, is also attached concentrically to the outer side of the driving-wheel, the flange H being near the rim of the wheel.

On the inner end of the shaft *b* a pinion, I, is placed, said pinion being fitted in the space between the geared flange H and wheel G, the diameter of the pinion being less than the width of the space between the geared flange H and wheel G.

From the above description it will be seen that the pinion I may be made to gear into either the flange H or wheel G by simply turning the axle D, the result being due to the eccentric journaling of the axle D, the driving-wheel C shifting as the axle is turned. It will also be seen that the pinion I may be made to fit between the geared flange and wheel, so as not to be engaged with either, in the latter case the lever F being fitted between the pins *f f*, as shown in black, Fig. 1. When the pinion is in gear with the wheel H the lever F is fitted between the pins *e e*, and when in gear with the flange H it is fitted between the pins *g g*. When the pinion I is in gear with the wheel G the shaft *b*, from which motion is communicated to the sickle, will rotate slower than when said pinion is in gear with the flange H, and consequently the speed of the sickle may be adapted for cutting either grass or grain, a quicker motion being required for cutting grass than is necessary for cutting grain. In cutting the latter the sickle is raised considerably higher than in cutting grass, and this adjustment of the sickle is effected by simply adjusting the frame E at a greater or less height by means of the pins *c c* in the segment-bars *d d*, or by any equivalent device for raising and lowering the frame relatively to the driving and supporting wheel C. Besides the advantage of the change of speed, the change of the motion of the gearing makes the cogs wear evenly on both sides, presuming them to be equally used, and the crank-wrist wears round instead of flat, and the durability of the parts is increased one-third.

What we claim, and desire to secure by Letters Patent, is—

In combination with the pinion I, rotating in a fixed bearing in the frame, and a driving-wheel provided with gearing G and H, the hand-lever F and eccentric journal D, adapted to move the driving-wheel forward and backward, so as to bring either of the said gears G or H into engagement with the said pinion or equidistant from it and out of gear, substantially as described.

To the above specification of improvement in harvesters we have signed our hands this 8th of April, 1865.

WM. COGSWELL.
WILL. H. W. CUSHMAN.

Witnesses:
T. R. COURTNEY,
E. W. LELAND.